COLOR TELEVISION MATRIX SYSTEMS

Filed Jan. 24, 1956 2 Sheets-Sheet 1

INVENTOR
HOWARD J. GRONEMEIER
BY Elmer J. Gorn
ATTORNEY

Jan. 23, 1962 H. J. GRONEMEIER 3,018,323

COLOR TELEVISION MATRIX SYSTEMS

Filed Jan. 24, 1956 2 Sheets-Sheet 2

INVENTOR
HOWARD J. GRONEMEIER
BY Elmer J. Gorn
ATTORNEY 3,018,323

COLOR TELEVISION MATRIX SYSTEMS

Howard J. Gronemeier, Lombard, Ill., assignor to Raytheon Company, a corporation of Delaware Filed Jan. 24, 1956, Ser. No. 561,030
10 Claims. (Cl. 178—5.4)

Figure 1:
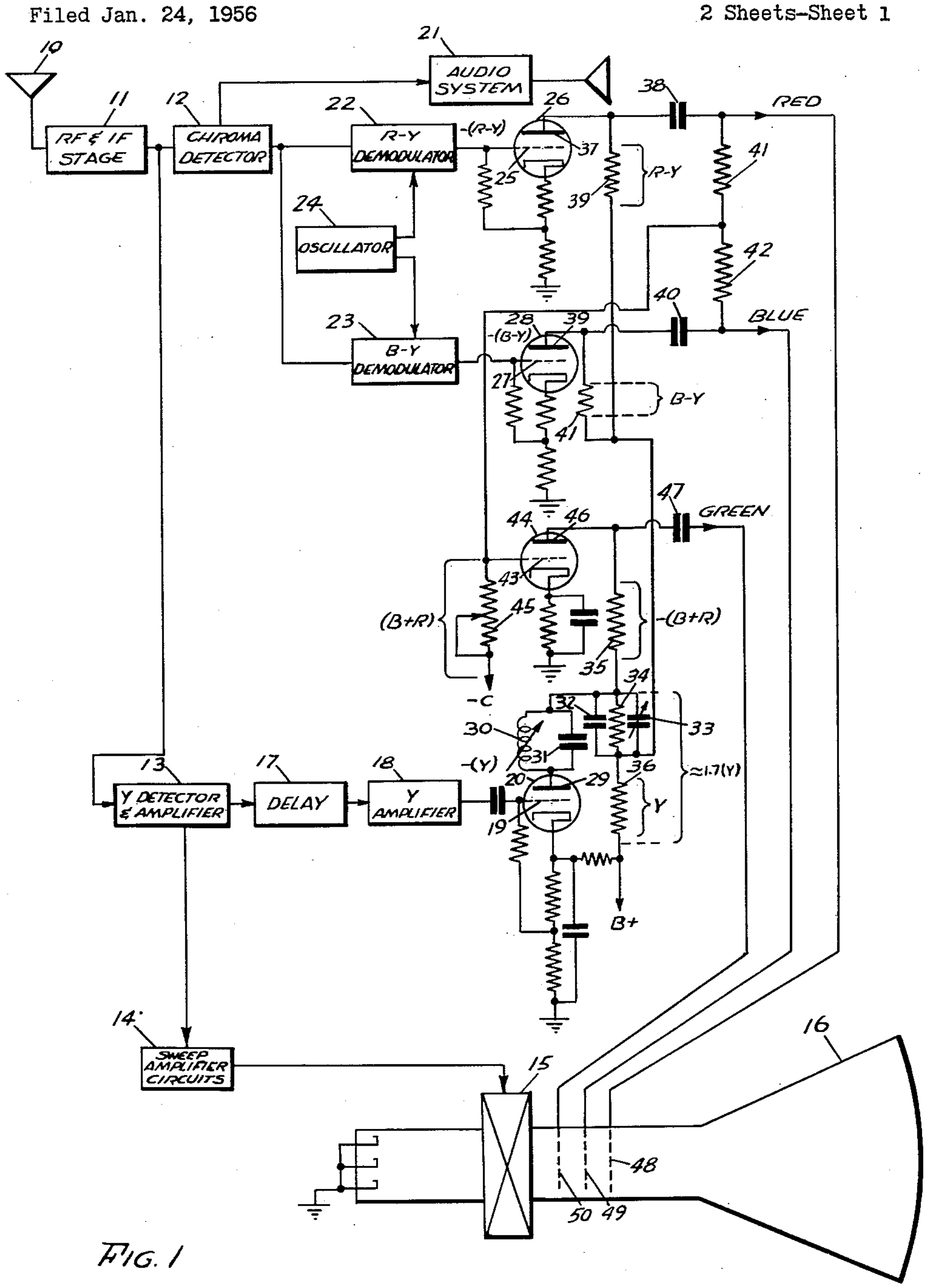

This invention relates to a matrix system and specifically to a matrix system for individually combining a first signal to each of a plurality of other independent signals.

In this invention there is disclosed a matrix system adaptable for use in a color television system in which information is transmitted on one or more subcarriers as in the NTSC type of color television system. This NTSC color system is described in an article entitled "Principles of NTSC Compatible Television," page 88 of Electronics Magazine published by McGraw-Hill Corporation in the February 1952 edition. In this type of color television system it is usual to produce a series of color difference signals, each containing different color information. Two independent signals, each representing different color difference information, are usually modulated on two subcarrier components having the same frequency but being in phase quadrature with each other.

These two independent signals, which contain all the color information, are detected and demodulated in the color television receiver where they are then combined with the black and white, or monochrome signal in order to form the individual red, green and blue signals. This black and white, or monochrome signal is formed by combining the red, green and blue signals in the proportions of:

$$Y = .59G + .30R + .11B \tag{1}$$

where Y represents the monochrome signal, G the green signal, R the red signal, and B the blue signal.

It has been proven mathematically that only two color difference signals, in addition to the black and white signal, are needed in order to obtain the necessary green, blue and red signals. The two color difference voltage signals that are needed may, for example, be $R—Y$ and $B—Y$ signals. This is possible since the green information is already present in the Y or black and white signal (see Equation 1). It is in the matrix system of the color receiver that the $R—Y$ and the $B—Y$ signals are combined with the Y signal to produce the red, blue and green signals.

This invention discloses a matrix system for producing a plurality of independent signals such as the $R—Y$ and $B—Y$ signals in a color receiver, which signals are each produced across separate plate load resistors associated with separate electron discharge devices. A reference signal such as the Y or black and white signal is produced across a plate load resistor associated with still another electron discharge device which plate load resistor is connected to a source of operating potential. The plurality of plate load resistors developing the individual color signals are each connected to the anode of the electron discharge devices producing the reference, or Y signal. Changing the Y or reference signal will therefore modulate the voltage applied to the anodes of each of the plurality of electron discharge devices in accordance with said reference signal thereby algebraically combining said reference signal with each of said independent signals.

Figure 2:
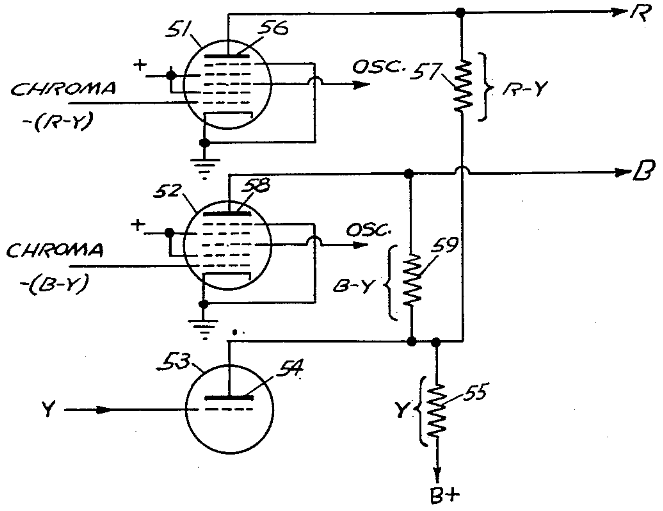

Further objects and advantages of this invention will be apparent as the description progresses, reference being made to the accompanying drawings:

FIG. 1 is a block diagram of a color television receiver illustrating an embodiment of this invention; and FIG. 2 is a simplified schematic diagram illustrating an advantage gained from utilizing this invention.

Referring now to FIG. 1, there is shown a color television receiver comprising an antenna 10 feeding a conventional RF and IF stage 11. Stage 11 usually contains a tuner followed by a video IF system which is somewhat more extensive than the video IF system of monochrome sets in that it usually contains more stages and its band pass is somewhat wider. The output of stage 11 feeds both a chroma detector 12 and a Y detector and amplifier 13. It should be remembered that reference to the Y signal always refers to the monochrome signal, and never to the yellow signal, which is in conformance with the art as practiced today. The output of stage 13 consists of the usual monochrome video and sync information which feeds the sweep amplifier circuits 14 which in turn feed deflection coils 15 which are located on a tri-color picture tube 16. The output of the detector and amplifier stage 13 is fed to a time delay network 17 which slows down the monochrome signal which then recombines with the color components in the matrix system. This delay is necessary since the band width of the Y signal is so much greater than the band width of the color component signals, and because of the fact that a narrow band width signal is delayed more than a wider band width signal. Delay stage 17 feeds a Y amplifier 18, which inverts the signal to —Y, and then effectively feeds said signal to grid 19 of tube 20.

Detection in a color receiver is a two stage process wherein, first the carrier which brought the full signal to the receiver is removed. This removed carrier is the Y signal. The color subcarriers are then removed so that the color video frequencies can be made available. The chroma detector 12 is the second of the two detectors, and it delivers two output signals one of which is the conventional intercarrier sound IF signal, which is fed to audio system 21 which contains an amplifier, a limiter, a ratio detector and necessary audio amplifiers all combined in the usual manner. The other output signal of chroma detector 12 is fed to both an $R—Y$ demodulator 22 and a $B—Y$ demodulator 23. The chroma detector also supplies the color burst signal which has not been illustrated. Oscillator stage 24 feeds both the $R—Y$ demodulator 22 and the $B—Y$ demodulator 23 thereby recreating, at the output of said stages, the demodulated carrier video signals. The output voltage of $R—Y$ demodulator 22 is $—(R—Y)$ which is fed to grid 25 of tube 26 and in a similar manner the output of $B—Y$ demodulator 23 which is $—(B—Y)$ is fed to grid 27 of tube 28.

Anode 29 of the Y amplifier tube 20 is connected through a parallel resonant trap tank circuit consisting of coil 30 and capacitor 31 to a junction of capacitors 32 and 33 and resistors 34 and 35. The other side of capacitors 32 and 33 and resistor 34 is connected to resistor 36 which in turn is connected to a source of operating potential designated as B+. Resistors 34 and 36 determine the complete plate load resistor for tube 20 and have the necessary values in order to produce a voltage across resistor 36 equivalent to the Y signal and a voltage across the combination of resistors 34 and 36 equivalent to 1.7Y.

Anode 37 of tube 26 is fed to a junction of capacitor 38 and load resistor 39 which in turn is fed to the junction of resistors 34 and 36. The value of load resistor 39 is chosen so that the voltage equivalent to the $R—Y$ signal is developed across said resistor, and since resistor 39 is connected in effect through resistor 36 for its operating potential, it will be observed that anode 37 will receive a voltage varying in accordance with the Y voltage. This will result in a $(R-Y)+Y$ voltage, or R voltage being fed to capacitor 38. In a similar manner, anode 39 of tube 28 is connected to a junction of capacitor 40 and plate load resistor 41 which in turn is also connected to the junction of resistor 34 and resistor 36 for its source of operating potential. The value of plate load resistor 41 is chosen so that a voltage equivalent to the $B-Y$ signal is developed. It can be seen, therefore, that a voltage having the magnitude of $(B-Y)+Y$ or B will be fed to capacitor 40.

The green voltage is derived in a conventional manner from components of the red and blue signal. Portions of the red and blue voltages are fed from a simple resistive network consisting of resistor 41 which is connected at one end to the output of capacitor 38 and at the other end to resistor 42 which is, in turn, connected to the output of capacitor 40. The output of this resistive network is taken from the junction of resistors 41 and 42 and fed to grid 43 of tube 44. Suitable bias through a variable resistor 45 is also fed to grid 43 in order to have a voltage of magnitude $B+R$ fed to said grid. Anode 46 of tube 44 is fed to a junction of capacitor 47 and load resistor 35. In this manner the voltage applied to anode 46 of tube 44 and its load resistor 35 will vary according to the value 1.7Y which is developed across resistors 34 and 36. This value of 1.7Y is determined by referring to Equation 1 and solving for G which will produce:

$$.59G=Y-.30R-.11B \quad (2)$$

or $$G=1.7Y-.51R-.19B \quad (3)$$

The red signal which is derived at the junction of capacitor 38 and resistor 41 is fed to grid 48 of color tube 16. In a similar manner, the blue output which is derived at the junction of capacitor 40 and resistor 42 is fed to grid 49 and the green voltage which is derived at capacitor 47 is fed to grid 50 of color tube 16. The cathode biasing techniques used for tubes 20, 26, 28 and 44 are conventional.

One of the advantages of this invention is that matrixing can now be accomplished without the losses that heretofore have been associated with the commonly used resistive networks. Since there is no loss in the disclosed matrix system, it is possible to eliminate the individual color amplifiers and instead combine the detected color signals directly at the outputs of the $R-Y$ and $B-Y$ demodulators. Referring now to FIG. 2, there is shown an embodiment of this invention that eliminates the individual red, green and blue amplifiers. A chroma signal having the proper phase is developed and fed in a conventional manner to the control grids of RY demodulator tube 51 and BY demodulator tube 52. The Y or monochrome signal is developed and fed in a conventional manner to the control grid of Y amplifier tube 53. The anode 54 of tube 53 is connected to a source of operating potential identified as B+ through a load resistor 55. In this manner the voltage developed across load resistor 55 will be the Y signal. The anode 56 of tube 51 is connected to anode 54 of tube 53 through a load resistor 57, thereby producing the output voltage of tube 51 which is the $R-Y$ signal developed across load resistor 57. The output signal from tube 51, which is actually the voltage at plate 56 with respect to its cathode, will therefore by the $(R-Y)+Y$ or R voltage. In a similar manner, anode 58 of tube 52 is connected to anode 54 of tube 53 through load resistor 59 thereby producing a $B-Y$ signal across resistor 59. The signal output from tube 52 is again a voltgae developed at anode 58 with respect to its cathode which is the $(B-Y)+Y$ or B signal. The development of the green signal can be done in any conventional manner. It can be seen, therefore, that the B supply voltage available at the plates of the demodulators is supplied through the Y amplifier plate load. Since the demodulator plate voltage varies in accordance with the Y signal and also in accordance with the voltage developed across the plate load of the demodulator, it can be seen that the signals for either the $R-Y$ demodulator or the $B-Y$ demodulator are added to the Y signal without any loss involved.

This completes the description of the embodiments of the invention illustrated herein. However, many modifications and advantages thereof will be apparent to persons skilled in the art without departing from the spirit and scope of this invention. For example, this system of matrixing is not limited to to any particular form of television system whether it be transmitter or receiver, but rather to any system wherein a reference voltage is to be added individually to each of a plurality of independent signals. Accordingly, it is desired that this invention not be limited to the particular details of the embodiment enclosed herein, except as defined by the appended claims.

What is claimed is:

1. A matrix system comprising means for producing a plurality of independent signals, which signals are each produced across separate load resistors, means for producing a reference signal across still another load resistor, and means for connecting each of said independent signals produced across each of said separate load resistors in series with the load resistor producing said reference signal in a manner to produce a voltage summation of said independent signals and said reference signal thereby algebraically combining by summation said reference signal with each of said independent signals.

2. A matrix system comprising a plurality of electron discharge devices each having at least an anode, a cathode and a grid, which anodes are each connected to separate load resistors, means for producing a plurality of independent signals, which independent signals are each developed across said separate load resistors associated with said electron discharge devices, means for producing a reference signal across still another load resistor, and means for connecting each of said independent signals produced across each of said separate load resistors in series with the load resistor producing said reference signal in a manner to produce a voltage summation of said independent signals and said reference signal thereby algebraically combining by summation said reference signal with each of said independent signals.

3. A matrix system comprising a plurality of electron discharge devices each having at least an anode, a cathode and a grid, which anodes are each connected to separate load resistors, means for producing a plurality of independent signals, which independent signals are each developed across said separate load resistors associated with said electron discharge devices, means for producing a reference signal across a load resistor connected to an anode of still another electron discharge device, and means algebraically combining each of said independent signals produced across each of said separate load resistors with said reference signal in a manner to produce a voltage summation of said independent signals and said reference signal thereby algebraically combining by summation said reference signal with each of said independent signals.

4. A matrix system comprising a plurality of electron discharge devices each having at least an anode, a cathode and a grid, which anodes are each connected to separate load resistors, means for producing a plurality of independent signals, which independent signals are each developed across said separate load resistors associated with said electron discharge devices, means for producing a reference signal across a load resistor connected to an anode of still another electron discharge device, and means connecting said load resistor developing said reference signal in series with the main current path of each of said load resistors developing said independent signals for modulating each of said independent signals with said reference signal thereby algebraically combining said reference signal with each of said independent signals.

5. A matrix system comprising a plurality of electron discharge devices each having at least an anode, a cathode and a grid, which anodes are each connected to separate load resistors, means for producing a plurality of independent signals within said electron discharge devices, which independent signals are each developed across said separate load resistors associated with said electron discharge devices, means for producing a reference signal across still another load resistor, and means for connecting each of said independent signals produced across each of said separate load resistors in series with the load resistor producing said reference signal in a manner to produce a voltage summation of said independent signals and said reference signal for algebraically combining said reference signal with each of said independent signals.

6. A matrix system comprising a first electron discharge device having at least an anode, a cathode and a grid, which anode is connected through a load resistor to a source of operating potential, means for producing a reference signal across said load resistor, a plurality of electron discharge devices each having at least an anode, a cathode and a grid, which anodes are each connected through separate load resistors to the anode of said first electron discharge device, means for producing a plurality of independent signals, which independent signals are each developed across said separate load resistors associated with the plurality of electron discharge devices, and means for connecting each of said independent signals produced across each of said separate load resistors in series with the load resistor producing said reference signal in a manner to produce a voltage summation of said independent signals and said reference signal thereby algebraically combining said reference signal with each of said independent signals.

7. A matrix system comprising a first electron discharge device having at least an anode, a cathode and a grid, which anode is connected through a load resistor to a source of operating potential, means for producing a reference signal across said load resistor, a plurality of electron discharge devices each having at least an anode, a cathode and a grid, which anodes are each connected through separate load resistors to the anode of said first electron discharge device, means for producing a plurality of independent signals, which independent signals are each developed across said separate load resistors associated with the plurality of electron discharge devices, and means for modulating the voltage applied to the anodes of each of the plurality of electron discharge devices in accordance with said reference signal thereby by connecting said load resistor producing said reference signal in series with said separate load resistors algebraically combining said reference signal with each of said independent signals.

8. A matrix system comprising electron discharge means for producing a plurality of independent signals, which signals are each produced across separate load resistors, means for producing a reference signal across still another load resistor, and means for connecting each of said independent signals produced across each of said separate load resistors in series with said reference signal in a manner to produce a voltage summation of said independent signals and said reference signal for algebraically combining said reference signal with each of said independent signals.

9. A matrix system comprising a first electron discharge device having at least an anode, a cathode and a grid, which anode is connected through a first load resistor to a source of operating potential, and a plurality of electron discharge devices each having at least an anode, a cathode and a grid, which anodes are each connected through separate load resistors substantially to the anode of said first electron discharge device thereby to provide a voltage summation of signal voltages developed across said first load resistor and said separate load resistors.

10. A color television system comprising means for producing a pair of independent color signals, which signals are each produced across separate load resistors, means for producing a monochrome signal across still another load resistor, and means for connecting each of said color signals in series with said monochrome signal in a manner to provide voltage summation of said color signals with said monochrome signal thereby algebraically combining by summation said monochrome signal with each of said color signals.

References Cited in the file of this patent

UNITED STATES PATENTS

| | | |
|---|---|---|
| 2,722,563 | Loughlin | Nov. 1, 1955 |
| 2,732,425 | Pritchard | Jan. 24, 1956 |
| 2,779,818 | Adler | Jan. 29, 1957 |
| 2,877,347 | Clark | Mar. 10, 1959 |

OTHER REFERENCES

Color TV, Rider Pub., March 1954, pages 105 to 108.

Color TV, Rider Pub., March 1954, pages 141 and 142.

Design Techniques for Color Television Receivers, Electronics, February 1954, pages 136 to 143.